United States Patent [19]
Inoue et al.

[11] 3,786,330
[45] Jan. 15, 1974

[54] AUTOMATIC WINDSHIELD WIPING APPARATUS BY USING MICROWAVES FOR VEHICLES

[75] Inventors: Goro Inoue; Ming-Tsung Huang, both of Hamamatsu, Japan

[73] Assignee: Nippendenso Co., Ltd., Aichi-ken, Japan

[22] Filed: Apr. 28, 1972

[21] Appl. No.: 248,487

Related U.S. Application Data

[63] Continuation-in-part of Ser. No. 10,130, Feb. 10, 1970, abandoned.

[52] U.S. Cl. .......... 318/483, 318/DIG. 2, 324/58.5 B
[51] Int. Cl. ............................................. H02p 3/00
[58] Field of Search ............. 318/483, 443, DIG. 2; 324/58.5 B

[56] References Cited
UNITED STATES PATENTS

| | | | |
|---|---|---|---|
| 3,649,898 | 3/1972 | Inoue | 318/443 X |
| 2,999,982 | 9/1961 | Broussaud | 324/58.5 B |
| 2,463,297 | 3/1949 | Muskat et al. | 324/58.5 A |
| 2,477,347 | 7/1949 | Posey | 324/58.5 B |
| 3,025,463 | 3/1962 | Luoma | 324/58.5 B |
| 2,407,215 | 9/1946 | Anderson | 318/483 X |

FOREIGN PATENTS OR APPLICATIONS

| | | | |
|---|---|---|---|
| 1,030,834 | 5/1966 | Great Britain | 324/58.5 B |
| 1,052,250 | 12/1966 | Great Britain | 324/58.5 B |
| 1,102,199 | 10/1955 | France | 324/58.5 B |
| 897,956 | 6/1962 | Great Britain | 324/58.5 B |

Primary Examiner—B. Dobeck
Attorney—John W. Malley et al.

[57] ABSTRACT

An automatic windshield wiping apparatus for vehicles which comprises a raindrops detecting device comprising a microwave oscillator, a wave guide adapted for irradiating microwaves generated by the microwave oscillator on the windshield of a vehicle and means responsive to change in microwaves reflected from or transmitted through the windshield due to raindrops thereon to detect the raindrops thereby changing its output signal; and a switching circuit adapted to drive a driving motor for a wiper of the windshield responsive to the change of the output signal from the raindrops detecting device.

4 Claims, 4 Drawing Figures

AUTOMATIC WINDSHIELD WIPING APPARATUS BY USING MICROWAVES FOR VEHICLES

CROSS-REFERENCES TO RELATED APPLICATIONS

This application is a continuation-in-part of a co-pending, now abandoned application Ser. No. 10,130 filed on Feb. 10, 1970 by the same applicants.

BACKGROUND OF THE INVENTION

1. Field of the Invention

This invention relates to an automatic windshield wiping apparatus for vehicles and more particularly to an apparatus for automatically actuating a wiper of the windshield of a vehicle by detecting raindrops on the windshield by using microwaves.

2. Description of the Prior Art

In a conventional windshield wiping apparatus, the driver must manually turn on a wiper switch for driving a wiper motor thereby actuating a wiper on the windshield when the rain begins to fall and turn off when the rain stops. The situation often occurs when the automobile is being driven and then the driver must operate the switch while driving the automobile. Such operation must be not only dangerous, but also troublesome.

SUMMARY OF THE INVENTION

It is an object of the present invention to provide an apparatus for automatically actuating a wiper on a windshield of a vehicle by detecting raindrops on the windshield from change due to the raindrops in microwaves reflected from or transmitted through the windshield after being irradiated thereon through a waveguide from a microwave oscillator, whereby the driver is free from the dangerous and troublesome operation.

DESCRIPTION OF THE PREFERRED EMBODIMENTS

Figure 4:
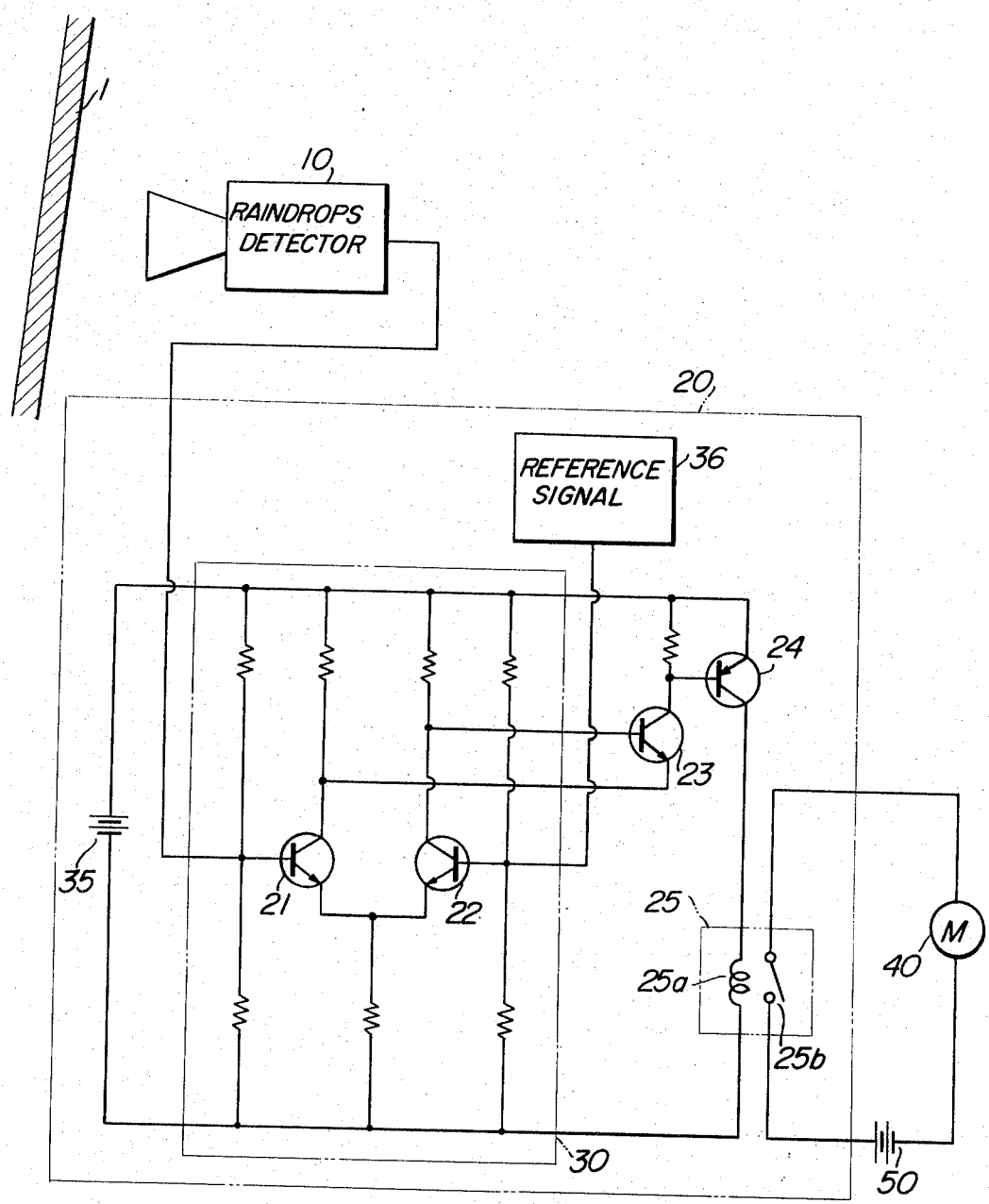
FIG. 4 is a schematic diagram showing an embodiment of the present invention.

Description will now be made of an embodiment applied to an automobile with reference to the drawings. The general layout of the embodiment is shown in FIG. 4, in which reference numeral 1 indicates a windshield, 10 a raindrops detecting device by using microwaves as described in detail hereinafter, 20 a switching circuit for actuating a driving motor 40 of a wiper upon receiving an output signal from the raindrops detecting device and 50 a power source for the driving motor.

Figure 1:
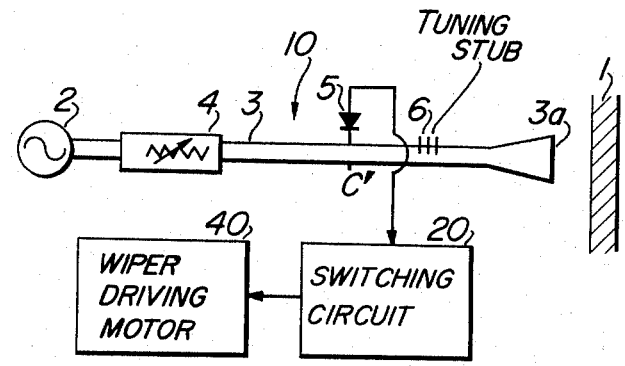
FIG. 1 is a schematic view showing the construction of an embodiment of a reflection type of raindrops detecting device according to the invention.

A reflection type of the raindrops detecting device shown in FIG. 1 in which the reference numeral 1 designates a windshield made of glass, 2 a microwave oscillator constituted by a vacuum tube, a semiconductor or a klystron, and 3 a waveguide which is coupled with the output end of the oscillator 2 and which is disposed perpendicular to the windshield 1. An open end 3a of the waveguide 3 is located adjacent to the windshield 1. An attenuator designated by 4 is arranged on the waveguide 3 at the output end of the microwave oscillator 2. Numeral 5 indicates a detector positioned on the waveguide 3 at the posterior stage of the attenuator 4. A tuning stub 6 is incorporated in the waveguide 3 posterior to the detector 5. The attenuator 4 mentioned above may also be constructed integrally with the microwave oscillator 2.

Figure 2:
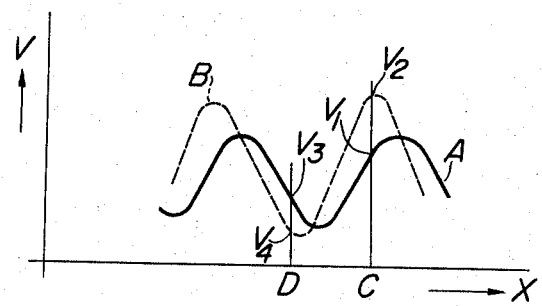
FIG. 2 is a graph illustrating the characteristics of standing waves in a waveguide of the reflection type device shown in FIG. 1.

The operation of the reflection type device constructed as described above, will now be explained. Microwaves of a frequency higher than several GHz, 10 GHz for example, are generated by means of the microwave oscillator 2. The output of the microwaves is attenuated to an appropriate value by means of the attenuator 4, and is then guided within the waveguide 3 to be irradiated onto the windshield 1 from the open end 3a through the detector 5 as well as the tuning stub 6. The microwaves are then passed through the windshield 1 to be radiated into the air. In this case, if the windshield 1 and the medium of air are not matched with the interior of the waveguide 3, standing-waves reflected waves will be generated. FIG. 2 shows the state of the standing waves inside the waveguide 3. In the figure, the axis of abscissas represents positions X of the waveguide 3 in the axial direction, while that of ordinates shows the magnitudes V of the standing waves. A curve A in the figure illustrates the standing wave in a case where nothing is stuck onto the surface of the windshield. When raindrops, for example, are adhered onto the surface of the windshield 1, the standing wave will become as depicted by a curve B, due to the change in the rate of the matching between the windshield 1 as well as the medium of air and the interior of the waveguide 3. Comparing the curve B with the curve A, the standing-wave ratio and the phase vary. Accordingly, by disposing the detector 5 at, for example, a point C' on the waveguide 3 so as to correspond to the position of a point C on the axis of abscissas in FIG. 2, there may be obtained a detected voltage of the detector 5 which is equal to the difference between a voltage $V_1$ and an elevated voltage $V_2$.

Alternatively, by leaving the detector 5 fixed and adjusting the position of the tuning stub 6, the same results may be obtained as in the disposition of the detector 5 at the point C'. Furthermore, a suitable choice of the magnitude of the standing-wave ratio enables the rate of variation in the detected voltage of the detector 5 to be adjusted to a maximum.

When the detector 5 is disposed at, for example, a point D' on the waveguide 3 so as to correspond, not to the point C, but to a point D on the axis of the abscissas in FIG. 2, the amount of raindrops adhering onto the surface of the windshield 1 may be detected as a difference in the detected voltages of the detector 5 between a voltage $V_3$ and a lower voltage $V_4$.

Now, an example of the performance of the aforesaid reflection type device will be given in numerical values. There was used for the windshield 1, a plate glass 5 mm thick; for the microwave oscillator 2, constituted by a klystron type 2K25; for the waveguide 3, a waveguide having the fundamental mode $TE_{10}$ in the X-band; for the attenuator 4, an attenuator having a rated attenuation as much as 40 dB, and for the detector 5, one of the 1N23B type. The microwave oscillator 2 was set to the oscillation frequency of 10 GHz, while the attenuator 4 had its amount of attenuation set to 20 dB. When the glass 1 was thus irradiated with microwaves, the standing-wave ratio of the standing waves inside the waveguide 3 at the time nothing was stuck onto the surface of the glass 1 was 1.2. The standing waves exhibited, when represented by the curve A in FIG. 2, 8 mV for the value of $V_3$ at the point D on the axis of abscissas. Upon uniformly adhering water droplets having a diameter of 0.5 mm and an average thickness of 0.1 mm onto the surface of the glass 1, there were generated inside the waveguide 3 standing waves as shown by the curve B in FIG. 2 in contrast to the curve A, with the value of $V_4$ at the point D on the axis of abscissas being 5 mV. In case where onto the surface of the glass 1 were similarly adhered water droplets having a diameter of 3 mm and a thickness of 1 mm at the rate of one droplet for 10 cm² on average, the value of $V_4$ was 5 mV. There was thus obtained good results that by detecting a voltage difference between $V_3$ and $V_4$ by means of the detector 5, the quantity of water droplets adhering to the glass 1 may be accurately detected. Incidently, the microwave oscillation frequency should be equal to or higher than 10 GHz to obtain better results in respect of water droplets.

Figure 3:
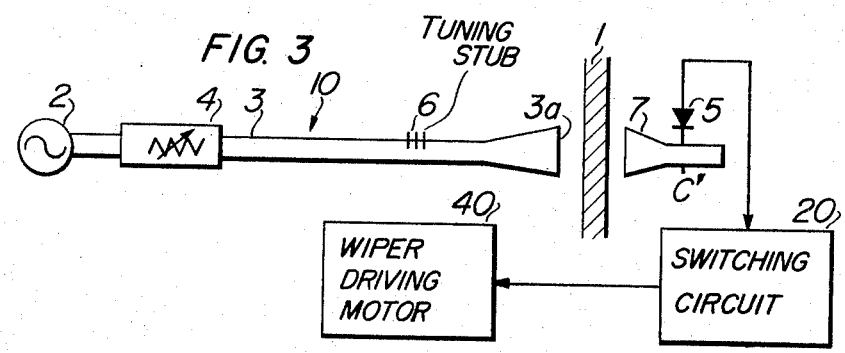
FIG. 3 is a schematic view showing the construction of an embodiment of a transmission type of the raindrops detecting device according to the invention.

Description will now be made of a transmission type of the raindrops detecting device, with reference to FIG. 3. In this figure, the reference numerals 1 through 6 designate the same constituting elements as those used in the first embodiment referred to above respectively. At 7 is illustrated another waveguide for reception, which is disposed opposite to the open end 3a of the waveguide 3 with the windshield 1 interposed therebetween. In addition, the detector 5 is arranged on the receiving waveguide 7.

In operation, microwaves of, for example, 10 GHz are generated by means of the microwave oscillator 2. The microwave output is, after suitable attenuation by the attenuator 4, guided inside the waveguide 3 and irradiated from the open end 3a of the said waveguide 3 onto the windshield 1 through the tuning stub 6. The microwaves are then transmitted through the windshield 1, and are converted to a detection voltage by means of the detector 5 inside the receiving waveguide 7. The tuning stub 6 is adjusted with no substance adhering onto the surface of the windshield 1, in such a manner that the microwave output of the oscillator 2 is radiated into the receiving waveguide 7 at the maximum level. When raindrops, for example, adhere onto the surface of the windshield 1 under such conditions, microwaves arriving through the windshield 1 into the receiving waveguide 7 are absorbed by the water due to the large absorption coefficient of raindrops for microwaves, with the result that the detection voltage by means of the detector 5 becomes lower than that at the above-mentioned adjustment. Accordingly, a variation in voltage indicated by the detector 5 provides an exact measurement of the amount of raindrops adhering onto the surface of the windshield 1.

Herein will be given in numerical values an example of performance of the above transmission type device. The windshield 1, microwave oscillator 2, waveguide 3, attenuator 4 and the detector 5 used in this experiment, were just the same as those used in the embodiment described with reference to FIG. 1. The oscillation frequency of the microwave oscillator 2 was set at 10 GHz, while the degree of attenuation of the attenuator 4 was set at 10 dB. Thus, microwaves were irradiated onto a plate glass of the windshield 1 at 10 GHz. Then, when nothing was stuck onto the glass 1, the detected voltage of the detector 5 was 17 mV. Thereafter, upon uniform adhesion of water droplets having a diameter of 0.5 mm and an average thickness of 0.1 mm onto the surface of the glass 1, the detection voltage of the detector 5 was changed to 10 mV. When the surface of the glass 1 was similarly adhered thereon with water droplets of a diameter of 3 mm and a thickness of 1 mm at the rate of one droplet for 10 cm², the voltage detected by the detector 5 became 12 mV. There were thus obtained good results such that a change in the detection voltages of the detector 5 may provide a precise detection of the quantity of water droplets adhering onto the surface of the glass. The respective axes of the waveguide 3 and the receiving waveguide 7 should be brought into alignment in order to accomplish the best results.

The switching circuit 20 is arranged as shown in FIG. 4 in which 30 is a known type of a differential amplifier incorporating a pair of transistors 21 and 22. 23 is a transistor, whose base and emitter are connected to the collectors of the transistors 22 and 21, respectively, while the collector of the transistor 23 is connected to a base of a transistor 24. 25 indicates a relay having a coil 25a and a switch 25b. When the transistor 24 is rendered conductive, the relay coil 25 is energized through the transistor 24 by a power source 35, thereby turning on the relay switch 25b.

As previously mentioned, the raindrops detecting device 10 produces at the detector 5 an output signal which varies depending upon whether raindrops are adhered on the windshield 1 or not. A reference signal 36 is provided to supply the base of the transistor 22 with a voltage which is substantially the same as the output signal at the detector 5 when no raindrop is adhered on the windshield. The output signal from the detector 5 of the raindrops detecting device is applied to the base of the transistor 21. Thus, when substantially no raindrops are adhered on the windshield, the collectors of the transistors 21 and 22 are at substantially the same voltage thereby turning off the transistor 23 and hence the transistor 24. When a certain amount of raindrops are adhered on the windshield, the output signal from the detector 5 changes which in turn produces a voltage difference between the collectors of the transistors 21 and 22, thereby turning on the transistor 23 and hence the transistor 24. Then the relay coil 25a is energized by a current through the transistor 24 and hence the relay switch 25b is closed whereby the wiper driving motor 40 is energized from a power source 50 thereby actuating the wiper. The raindrops are gradually removed from the windshield, and first means associated with said on the windshield becomes substantially zero, the output signal at the detector becomes substantially the same value as that of the reference signal 36 thereby turning off the transistor 23 and hence the transistor 24. Then, the relay switch opens and the wiper driving motor 40 stops. It will be clear that the amount of the raindrops for actuating the wiper is readily adjustable either by changing the position of the detector 5 and/or the position of the tuning stub 6 or by changing the voltage value of the reference signal 36.

As abovementioned, the present invention provides an apparatus comrpising a raindrops detecting device of a reflection type or a transmission type, which detects raindrops on the windshield from the change of microwaves reflected from or transmitted through the windshield due to variation of the reflexibility or the transmittivity of the windshield derived from raindrops adhered thereon and changes its output signal upon detecting the raindrops, and a switching circuit responsive to the change of the output signal from the raindrops detecting device for actuating a wiper by energizing a wiper driving motor, whereby the wiper is automatically actuated or stopped without any manual operation when the rain begins to fall or stops and hence the driver is free from any dangerous and troublesome operation. Thus, the invention contributes greatly to the safe driving of an automobile.

In the above embodiment, the microwaves are described as non-modulated, that is non-intermittant, microwaves and therefore the detector 5 produces a DC output signal. However, it is obvious for those skill in the art that the microwaves may be modulated in a known manner, for example by amplitude modulation, thereby changing the amplitude of the output signal from the detector 5 depending on whether the raindrops are adhered on the windshield or not.

We claim:

1. An automatic windshield wiping apparatus for vehicles comprising:
   a raindrops detecting device adapted to be located near the windshield of a vehicle,
   said raindrops detecting device comprising:
   a microwave oscillator for generating output microwaves,
   a waveguide having two ends operatively connected at one end to receive the output microwaves from said microwave oscillator and having the other end adapted to be disposed opposingly to one surface of said windshield so as to irradiate said output microwaves generated from said microwave oscillator on said one surface of said windshield, and
   first means associated with said oscillator and said waveguide for receiving a part of said microwaves irradiated on said one surface of said windshield and for producing an output signal responsive to the received microwaves,
   a switching circuit connected in circuit with said raindrops detecting device and including a reference signal source means for providing a reference signal and a differential amplifier for comparing the output signal produced by said first means with said reference signal and producing a further output signal when said output signal from the first means is substantially different from said reference signal, and
   second means connected in circuit with said switching circuit for driving a wiper on said windshield responsive to the further output signal produced by said differential amplifier.

2. An apparatus according to claim 1, wherein the other end of said waveguide is adapted to be disposed opposite to one surface of said windshield and said first means comprises a detector mounted at a predetermined position along the length of said waveguide for receiving microwaves reflected back from said windshield.

3. An apparatus according to claim 1, wherein:
   the other end of said waveguide is adapted to be disposed opposite to said one surface of said windshield, and further comprising
   a second waveguide adapted to be disposed opposite to the other opposite surface of said windshield and in alignment with said first-mentioned waveguide; and wherein
   said first means comprises a detector mounted at a predetermined position of said second waveguide for receiving microwaves transmitted through said windshield.

4. An apparatus as in claim 1 wherein said waveguide includes:
   tuning stub means mounted at a predetermined position along the length of said waveguide, and
   horn antenna means operatively connected to said other end of the waveguide for directing said output microwaves onto said one surface of the windshield.

* * * * *

UNITED STATES PATENT OFFICE
CERTIFICATE OF CORRECTION

Patent No. 3,786,330                    Dated January 15, 1974

Inventor(s) Goro Inoue; Ming-Tsung Huang

It is certified that error appears in the above-identified patent and that said Letters Patent are hereby corrected as shown below:

In the heading:

In item [73] Assignee:

read "Nippendenso" as --Nippondenso--

Add: --[30] Foreign Application Priority Data

Japan        February 14, 1969        No. 11213/69

In the claims

Read claim 1 (column 5 line 24 through column 6 line 13) as follows:

1. An automatic windshield wiping apparatus for vehicles comprising:

a raindrops detecting device adapted to be located near the windshield of a vehicle, said raindrops detecting device comprising:

a microwave oscillator for generating uniform output microwaves, a waveguide having two ends operatively connected at one end to receive continuously said uniform output microwaves from said microwave oscillator and having the other end adapted to be disposed opposingly to one surface of said windshield so as to irradiate said output microwaves generated from said microwave oscillator on "continued on page 2"

UNITED STATES PATENT OFFICE
CERTIFICATE OF CORRECTION

Patent No. 3,786,330      Dated January 15, 1974

Inventor(s) Goro Inoue; Ming-Tsung Huang

It is certified that error appears in the above-identified patent and that said Letters Patent are hereby corrected as shown below:

<u>In the claims</u> (claim 1 con't)

said one surface of said windshield, first means associated with said oscillator and said waveguide for receiving a part of said microwaves irradiated on said one surface of said windshield and for producing voltage output signal responsive to the received microwaves, a switching circuit connected in circuit with said raindrops detecting device and including a voltage reference signal source means independent of said oscillator and its said output microwaves and said waveguide for providing a reference voltage signal and a differential amplifier for comparing the voltage output signal produced by said first means with said reference voltage signal and producing a further output signal when said output signal from the first means is substantially different from said reference signal, and second means connected in circuit with said switching circuit for driving a wiper on said windshield responsive to the further output signal produced by said differential amplifier.

Signed and sealed this 16th day of July 1974.

(SEAL)
Attest:

McCOY M. GIBSON, JR.
Attesting Officer

C. MARSHALL DANN
Commissioner of Patents